(12) United States Patent
Sosnik

(10) Patent No.: US 6,502,013 B1
(45) Date of Patent: Dec. 31, 2002

(54) METHOD AND APPARATUS FOR FILLING CONTAINERS WITH A TARGET WEIGHT OF PRODUCT

(76) Inventor: Al Pinhas Sosnik, 26925 Lost Oak Ct., Calabasas Hills, CA (US) 91301

(*) Notice: Subject to any disclaimer, the term of this patent is extended or adjusted under 35 U.S.C. 154(b) by 0 days.

(21) Appl. No.: 09/521,523

(22) Filed: Mar. 8, 2000

(51) Int. Cl.[7] .................... G06F 17/00; G01G 13/24; G01G 13/00; G01G 19/22
(52) U.S. Cl. .................... 700/240; 177/64; 177/57; 177/70
(58) Field of Search .................... 700/240, 241; 177/57, 66, 70, 105, 106, 116, 119–123, 64; 222/56, 57, 58, 161

(56) References Cited

U.S. PATENT DOCUMENTS

| | | | | |
|---|---|---|---|---|
| 4,111,336 A | * | 9/1978 | Ward et al. | 177/116 X |
| 5,639,995 A | * | 6/1997 | Mosher | 177/116 X |
| 5,767,455 A | * | 6/1998 | Mosher | 177/119 X |
| 5,780,780 A | * | 7/1998 | Ahmed | 177/119 X |
| 6,060,667 A | * | 5/2000 | Pollock | 177/121 X |
| 6,091,028 A | * | 7/2000 | Ozaki et al. | 177/121 X |
| 6,121,556 A | * | 9/2000 | Cole | 177/119 X |

* cited by examiner

Primary Examiner—Christopher P. Ellis
Assistant Examiner—Gene O. Crawford
(74) Attorney, Agent, or Firm—Freilich, Hornbaker & Rosen

(57) ABSTRACT

An enhanced filling/weighing system utilizes first and second weighing stages. The first stage includes a first top container having an associated weighing device, e.g., a load cell. The second stage includes a second bottom container having an associated weighing device, e.g., a load cell. A high speed bulk feed subsystem supplies product to the top cup. A low speed dribble feed subsystem supplies product to the lower cup. In operation, the bulk feed subsystem feeds product to the top cut at a high speed. The top cup fills to its first setpoint (plus overfill, e.g., attributable to feed momentum) once per cycle. When the system controller recognizes that the top cup weight has reached the first setpoint, it pauses th bulk feed, discharges the top cup into the bottom cup, starts the dribble feed into the bottom cup, and starts the next cycle of bulk feed into the top cup. Thus, the top cup fills at high speed during cycle N+1 concurrently with the bottom cup filling at low speed during cycle N. When the system controller recognizes that the bottom cup weight has reached a second setpoint, the dribble feed is interrupted and the content is transferred out of the bottom cup awaiting the next transfer from the top cup.

11 Claims, 4 Drawing Sheets

TOP CUP

BOTTOM CUP

METHOD AND APPARATUS FOR FILLING CONTAINERS WITH A TARGET WEIGHT OF PRODUCT

FIELD OF THE INVENTION

This invention relates generally to a method and apparatus for rapidly filling small containers with an accurate weight of a product consisting of discrete pieces. The product can, for example, comprise beans, nuts, hard candy, fruit items, hardware items, etc.

BACKGROUND OF THE INVENTION

Various systems are described in the prior art for rapidly filling small containers, e.g., one, three, or five pound, with discrete pieces of product, e.g., beans, nuts, hard candy, fruit items, hardware items, etc. Such systems typically include a product supply station which supplies the product onto a feeder subsystem, which in turn sequentially feeds pieces to a weighing station. A controller monitors the weight of the product at the weighing station and attempts to control the feeder subsystem and the discharge from the weighing station in order to achieve a precise discharge, by weight, into a product container.

Such systems traditionally use either a "linear weigh" or a "combination weigh" procedure for filling the container with a correct product weight. In a typical linear weigh system, each successive cycle is comprised of two sequential phases, frequently referred to as a "bulk feed" phase and a "dribble feed" phase. During the bulk phase, a weighing cup is filled at high speed, e.g., by a conveyor, vibratory feeder, gravity gate, pump, etc., toward a target weight. When the cup weight reaches a first setpoint, the controller terminates the bulk phase high speed feed and switches to the dribble phase low speed feed. The cup weight thereafter increases at a lesser rate enabling the system to respond to a second setpoint to stop the product feed close to the target weight. Typically, the first setpoint is set at about 80% of the target weight in anticipation of overfill attributable to feed momentum (i.e., "in-the-air") and component reaction time. In practice, with a first setpoint set at about 80% of target weight, the cup will typically weigh about 90–95% of target weight at the end of the bulk phase. The second setpoint is set to about 100% of target weight to cause the cup weight to just reach target weight when the dribble phase ends and the product pieces settle. It should be understood that the aforementioned setpoint numbers are exemplary only and depend in significant part on the reaction time of the system, the feed speeds, the incremental weight of each product piece, the geometry, settling time, etc. Thus it is generally necessary to "fine tune" a system to optimize accuracy and throughput.

Although the implementations of linear weigh systems can differ markedly, the cycle duration of such systems is comprised of the sum of the bulk phase duration and the dribble phase duration. Typically, the dribble phase, which may only involve about a few percent of the product weight, might consume up to 40% of the total cycle duration.

SUMMARY OF THE INVENTION

The present invention is directed to an enhanced filling/weighing system capable of exhibiting a greater system throughput than the aforedescribed linear systems. Enhanced throughput is achieved by configuring the system to concurrently perform bulk and dribble operations. More particularly, systems in accordance with the invention execute the bulk phase of cycle N+1 concurrent with the execution of the dribble phase of cycle N.

A preferred embodiment of the invention utilizes first and second weighing stages. The first stage includes a first top cup or container having an associated weighing device, e.g., a load cell. The second stage includes a second bottom cup or container having an associated weighing device, e.g., a load cell. A high speed bulk feed subsystem supplies product to the top cup. A low speed dribble feed subsystem supplies product to the lower cup, which can in fact comprise the end product container, e.g., a one pound capacity bag or box.

In operation, the bulk feed subsystem feeds product to the top cup at a high speed. The top cup fills to its first setpoint (plus overfill) once per cycle. When the system controller recognizes that the top cup weight has reached the first setpoint, it pauses the bulk feed, discharges the top cup into the bottom cup, starts the dribble feed into the bottom cup, and starts the next cycle of bulk feed into the top cup. Thus, the top cup fills at high speed during cycle N+1 concurrently with the bottom cup filling at low speed during cycle N. When the system controller recognizes that the bottom cup weight has reached the second setpoint, the dribble feed is interrupted and the content is transferred from the bottom cup to an end-proudct container. In a preferred system, the bottom cup comprises an end-product container so that after it is filled, it is moved and replaced by an empty end-product container.

DETAILED DESCRIPTION

Figure 1:
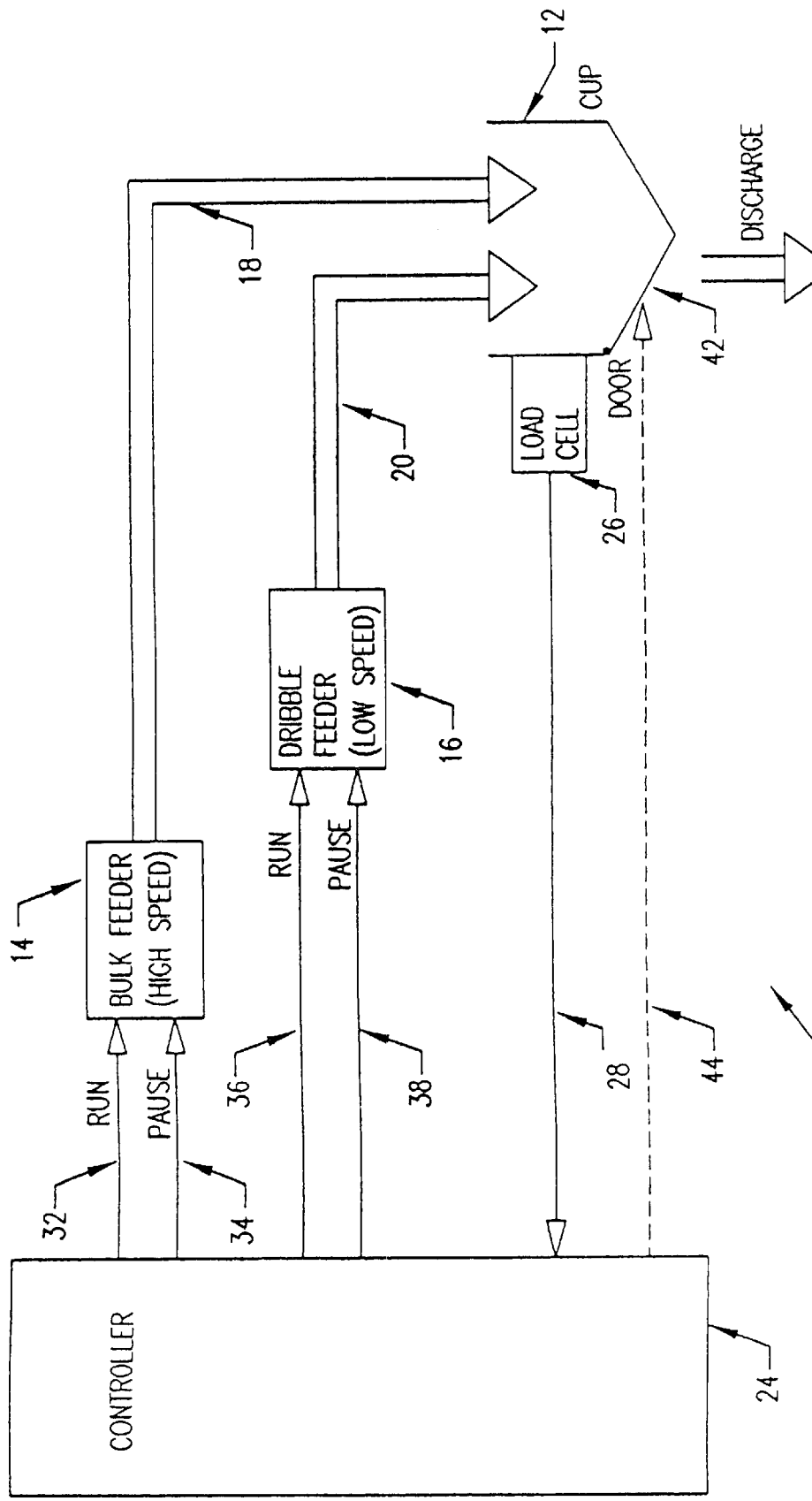
FIG. 1 is a block diagram of a typical prior art linear weigh system.

Attention is initially directed to FIG. 1 which illustrates a typical prior art linear weigh system 10. The system includes an output cup or container 12 which is fed by both a bulk feeder subsystem 14 and a dribble feeder subsystem 16. The bulk feeder 14 is configured to deliver discrete product pieces at a high rate via path 18 to the cup 12. The dribble feeder 16 is configured to deliver the same product pieces at a slower rate via path 20 to the cup 12.

Both the bulk feeder 14 and dribble feeder 16 are controlled by a controller 24. A weighing device, e.g., a load cell 26 is associated with the cup 12 to weigh the cup content and provide an information signal via line 28 to the controller 24. The controller 24 responds to the information on line 28 to control the bulk feeder 14 via its RUN input 32 and its PAUSE input 34. Similarly, the controller 24 controls the operation of dribble feeder 16 via its RUN input 36 and its PAUSE input 38. Additionally, the controller typically controls a gate/door mechanism 42 via line 44. When the gate/door 42 is closed, product can accumulate within the cup 12. When the gate/door 42 is open, the cup content is discharged, e.g., into an end product container (not shown).

Figure 2A:
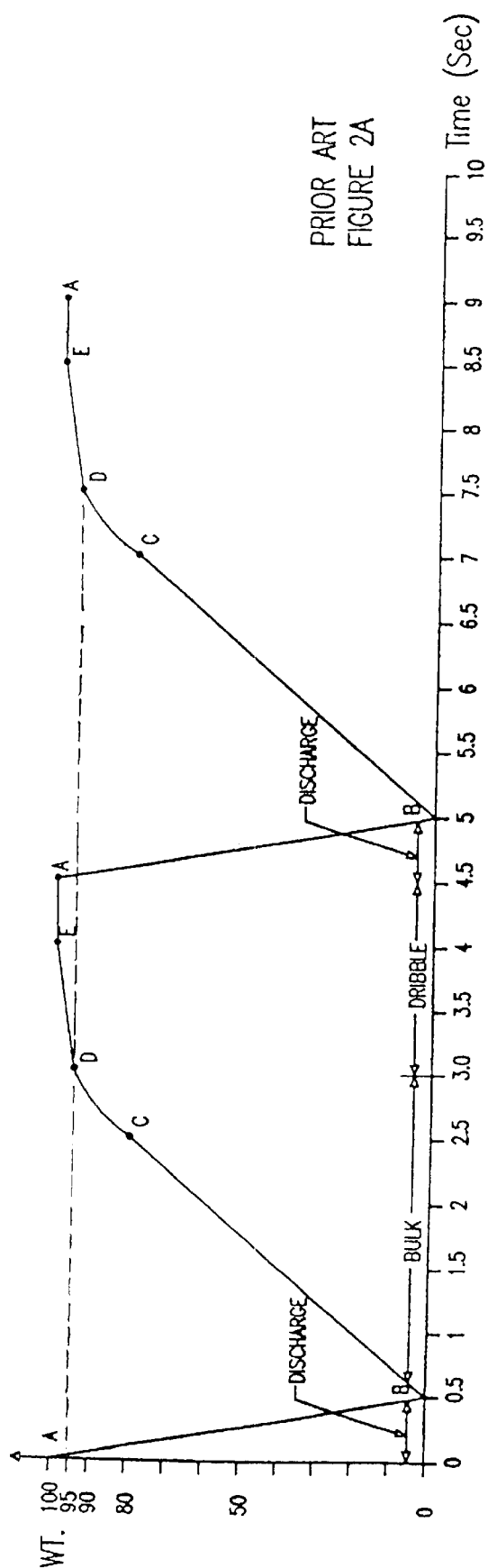
FIG. 2A is a timing chart plotting Target Weight Percentage vs. Time, and shows the operation of the prior art apparatus of FIG. 1.

The operation of the prior art apparatus represented in FIG. 1 is depicted in FIG. 2A which plots Target Weight Percentage vs. Time. In FIG. 2A, a cycle duration of 4.5 seconds has been assumed. The cycle duration is comprised of three principal phases, i.e. a discharge phase (0.5 seconds), a bulk feed phase (2.5 seconds), and a dribble feed phase (1.5 seconds). It should be understood that the aforementioned numbers are exemplary only and are merely intended to assist in understanding this description. In fact, the cycle and phase durations can vary considerably depending upon the particular hardware/software employed, the particular product being handled, the system geometry, etc.

In FIG. 2A, the discharge phase beginning at Time =0 is represented by the line segment AB. This phase empties the cup 12 and prepares it to receive a new product load. At point B, the bulk feeder 14 and dribble feeder 16 are activated via RUN inputs 32, 36 to feed product pieces via paths 18, 20 into the cup 12. The increasing weight of the product in cup 12 is represented by the substantially linear segment BC of FIG. 2A. Point C represents a first setpoint and is typically set to about 80% of the ultimate target weight. When this first setpoint is recognized by the load cell 26 and controller 24, the controller will pause the bulk feeder 14 via PAUSE input 34. In real world applications, the content weight of the cup 12 continues to increase for perhaps half a second after the pause signal is sent to the bulk feeder 14. This is attributable to various effects such as feed momentum and component reaction time, and is represented by the segment CD in FIG. 2A. At point D, the content weight is typically at approximately 95% of target weight. The controller 24 continues to run the dribble feeder 16 to increase the content weight at a slower rate from point D to point E. Point E represents the second setpoint and is typically set to 100% of target weight. Overshoot and settling time is represented by the segment EA. At point A (Time =4.5 seconds) the discharge phase of the next cycle begins.

Thus, it should be appreciated that in the prior art device represented in FIG. 1, the bulk feed and dribble feed durations occur sequentially. In typical existing systems, the dribble phase only contributes a few percent of the product weight and yet consumes up to forty percent of the cycle duration.

Figure 3:
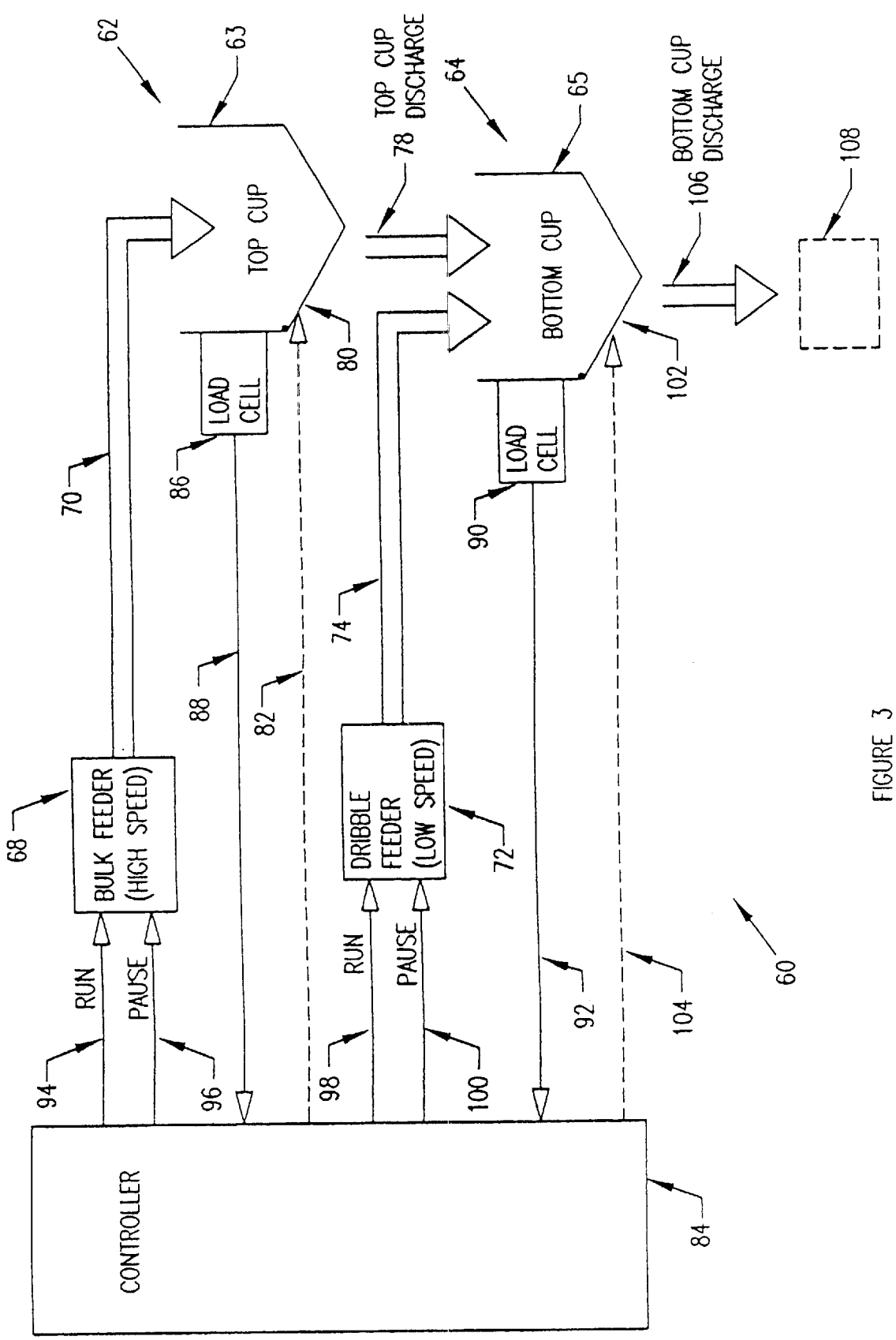
FIG. 3 is a block diagram of a preferred fill and weigh system in accordance with the present invention.

Attention is now directed to FIG. 3 which illustrates an embodiment 60 of the present invention employing a first weighing stage (or "station") 62 and a second weighing stage (or "station") 64. The weighing stages 62, 64 respectively contain a top cup (or "container") 63 and a bottom cup (or "container") 65. The top cup 63 is fed by bulk feeder subsystem 68 via path 70 at a high speed. The bottom cup 65 is fed by dribble feeder subsystem 72 via path 74 at a relatively low speed. The feeder subsystem 68 and 72 correspond essentially to the aforementioned subsystems 14 and 16 of FIG. 1.

The bottom cup 65 is additionally fed by the discharge 78 from the top cup 63 when its gate/door mechanism 80 is actuated via line 82 by controller 84.

A weighing device, e.g. load cell 86 is associated with top cup 63 and provides an information signal via line 88 to controller 84. Similarly, a load cell 90 is associated with bottom cup 65 and provides an information signal via line 92 to controller 84. Controller 84 responds to the information signals provided on lines 88 and 92 to control the bulk feeder subsystem 68 via RUN and PAUSE inputs 94 and 96. Similarly, controller 84 controls dribble feeder subsystem 72 via RUN and PAUSE inputs 98 and 100. Additionally, controller 84 operates the gate/door mechanism 102 via line 104 to discharge the bottom cup 65 at 106, e.g., into an end-product container 108. The operation of the system of FIG. 3 is represented in the timing charts of FIGS. 2B and 2C which demonstrates how throughput is increased by overlapping in time the bulk feed phase of one cycle with the dribble feed phase of a prior cycle. More particularly, attention is initially directed to FIG. 2B which is presented on the same time scale as the aforediscussed FIG. 2A. Note line segment FG in FIG. 2B which represents the discharge of the top cup 63. This corresponds to the line segment AB in FIG. 2A. Point G represents the start of bulk feed and point H represents the pause point. Line segments GH and HF in FIG. 2B, which correspond to the line segments BC and CD in FIG. 2A respectively define the bulk feed and overshoot intervals. Line segment FG (Time =3.0 seconds) repeats the discharge of the top cup 63 into the bottom cup 65. Thus it can be seen that the bulk phase of the top cup 63 has a duration of about three seconds corresponding to that represented in FIG. 2A.

Figures 2B, 2C:
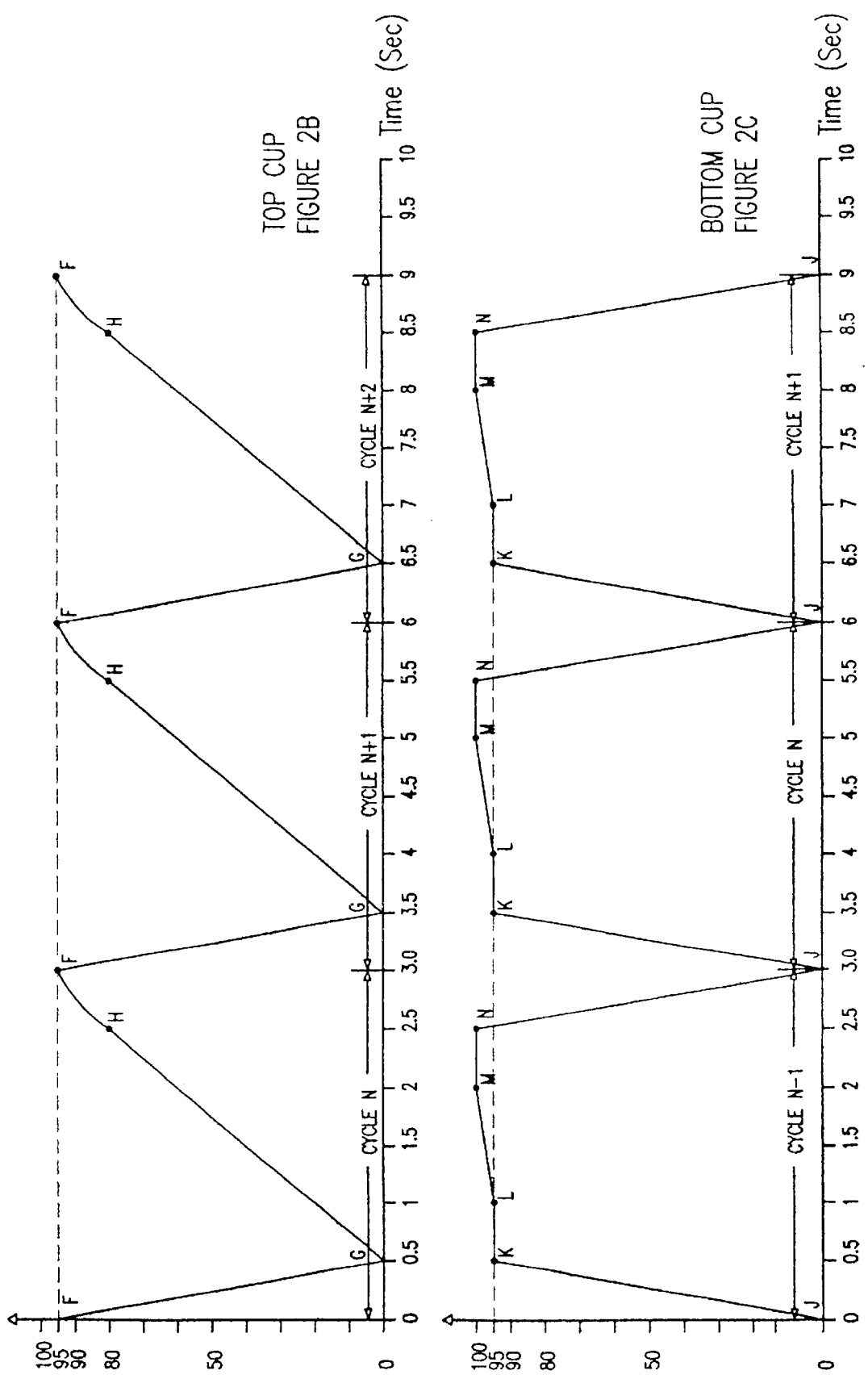
FIGS. 2B and 2C are timing charts respectively depicting the feeding of product pieces into first and second containers in accordance with the preferred embodiment of the invention depicted in FIG. 3.

The action of the bottom cup 65 is represented in FIG. 2C. Note that as the top cup discharges (i.e. line segment FG at Time =3.0 seconds), the weight of the bottom cup increases correspondingly (line segment JK). The dribble phase is then executed by the dribble feeder subsystem 72 feeding into the bottom cup 65. Points L and M respectively represent the resume and pause points of the dribble feed. The dribble phase, represented by line segments KL (settle interval initiated at Time =3.5 seconds), LM (dribble feed interval initiated at Time =4.0 seconds), and MN (settle time initiated at Time =5.0 seconds), is depicted as having about a two second duration. When the load cell 90 indicates that the bottom cup 65 has reached its second setpoint, the controller 84 then causes the bottom cup 65 to discharge its content, as represented by line segment NJ (Time =5.5 seconds), e.g., to the end-product container 108.

It is pointed out that the system of FIG. 3 can be implemented such that the dribble feeder 72 and top cup 63 feed directly to an end-product container rather than via the bottom cup 65 as aforediscussed. In such a system, after an end-product container is filled (i.e., point N in FIG. 2C), it is moved and replaced by an empty end-product container prior to starting a new cycle.

Thus, it should now be clear that applicant's embodiment of FIG. 3 is operated to overlap in time the bulk and dribble phases of a cycle to increase throughput without compromising accuracy. That is, a complete cycle N represented by a bulk phase from F to F in FIG. 2B (Time =0–3.0 seconds) followed by a dribble phase from J to J (Time) =3.0–6.0 seconds). However, during the execution of the dribble phase, the bulk phase of the next cycle N+1 is being executed. Accordingly, it can be seen that the discharge (line segment NJ) from the bottom cup 65 occurs at three second intervals as contrasted with the four and one-half second intervals characteristic of the prior art represented in FIG. 2A.

From the foregoing, it should now be appreciated that a method and apparatus has been disclosed herein for filling a container to a target weight comprised of first and second stages wherein a bulk feed operation is performed with respect to the first stage and a dribble feed operation is performed with respect to the second stage concurrent with the next execution of a bulk feed operation. It should be understood that applicant's system as depicted in FIG. 3 can be implemented in various manners using a variety of material handling devices such as vibratory feeders, conveyors, gravity gates, pumps, etc. Likewise, various mechanisms can be used for controlling the gate/door mechanisms for discharging product. The controller 84 can likewise be implemented in various manners such as a special purpose circuit or a software controlled electronic microcontroller.

What is claimed is:

1. An apparatus for filling a container with a target weight of discrete product pieces, said apparatus comprising:

a first weighing stage for generating a first signal when the content weight thereof is equal to or greater than a first setpoint;

a bulk feeder selectively operable to feed product pieces to said first weighing stage at a first rate;

a second weighing stage for generating a second signal when the content weight thereof is equal or greater than a second setpoint;

a dribble feeder selectively operable to feed product pieces to said second weighing stage at a second rate less than said first rate; and a controller for operating said bulk feeder and said dribble feeder, said controller defining successive operational cycles for accumulating an output quantity of product pieces in said second weighing stage during each cycle each of said operational cycles being comprised of (1) a bulk feed phase during which a bulk feed quantity is accumulated in said first weighing stage and, in response to said first signal, is rapidly transferred to said second weighing stage and (2) a dribble feed phase during which a dribble feed quantity is contributed to said second weighing stage and, in response to said second signal, the content of said second weighing stage is rapidly discharged therefrom; and wherein the dribble feed phase of an operational cycle N over laps in time with the bulk feed phase of a subsequent operational cycle N+1.

2. The apparatus of claim 1 wherein said first weighing stage includes a first container and a first weighing device for indicating the weight of product pieces in said first container; and wherein said second weighing stage includes a second container and a second weighing device for indicating the weight of product pieces in said second container; and wherein said controller is responsive to the weight indications provided by said first and second weighing devices for transferring product pieces from said first and second weighing stages.

3. An apparatus for filling a container with a target weight of discrete product pieces, said apparatus comprising:

a first weighing station;

a bulk feeder selectively operable to feed a first stream of product pieces to said first weighing station at a first rate;

a second weighing station;

a dribble feeder selectively operable to feed a second stream of product pieces to said second weighing station at a second rate less than said first rate and wherein said second stream does not comprise pieces from said first stream; and a controller for operating said bulk feeder to feed said first stream product pieces to said first weighing station and for concurrently operating said dribble feeder to feed said second stream product pieces to said second weighing station;

said controller being (1) responsive to the product weight of said first weighing station reaching a first setpoint for pausing said bulk feeder and rapidly transferring the content of said first weighing station to said second weighing station and (2) responsive to the product weight of said second weighing station substantially reaching said target weight for pausing said dribble feeder and rapidly discharging the content of said second weighing station to said container.

4. The apparatus of claim 3 wherein said first weighing station includes a first container and a first weighing device for indicating the weight of product pieces in said first container; and wherein said second weighing station includes a second container and a second weighing device for indicating the weight of product pieces in said second container; and wherein said controller is responsive to the weight indications provided by said first and second weighing devices for transferring product pieces from said first and second containers.

5. The apparatus of claim 4 including a first mechanism actuatable by said controller to transfer product pieces from said first container to said second container.

6. The apparatus of claim 5 wherein said second container comprises an end-product container.

7. The apparatus of claim 5 wherein said first mechanism comprises a door mounted to open when actuated to discharge product pieces from said first container by gravity.

8. The apparatus of claim 7 wherein said second container is located relative to said first container to receive product pieces discharged from said first container.

9. A method of filling a container with a target weight of discrete product pieces comprising the steps of:

feeding product pieces from a bulk feed source to a first container at a first rate;

interrupting said feeding to said first container when the weight thereof reaches a first percentage of said target weight;

transferring the content of said first container to a second container;

resuming the feeding of product pieces from said bulk feed source to said first container at said first rate and concurrently feeding product pieces from a dribble feed source to said second container at a second rate less than said first rate to supplement the content of said second container; and interrupting said feeding from said dribble feed source to said second container when the weight thereof reaches a second percentage of said target weight.

10. The method of claim 9 including the further step of transferring the content of said second container to an end-product container.

11. The method of claim 9 wherein second container comprises an end-product container.

* * * * *